(12) United States Patent
Ishizawa et al.

(10) Patent No.: US 8,972,659 B2
(45) Date of Patent: Mar. 3, 2015

(54) MEMORY CONTROL DEVICE, MEMORY DEVICE, MEMORY CONTROL METHOD, AND PROGRAM

(75) Inventors: Hiroaki Ishizawa, Chiba (JP); Nobuhiro Kaneko, Kanagawa (JP); Shusuke Saeki, Tokyo (JP); Takashi Kida, Tokyo (JP); Tomohiro Katori, Tokyo (JP)

(73) Assignee: Sony Corporation, Tokyo (JP)

( * ) Notice: Subject to any disclaimer, the term of this patent is extended or adjusted under 35 U.S.C. 154(b) by 193 days.

(21) Appl. No.: 13/416,535

(22) Filed: Mar. 9, 2012

(65) Prior Publication Data
US 2012/0239884 A1 Sep. 20, 2012

(30) Foreign Application Priority Data
Mar. 17, 2011 (JP) .................. 2011-059385

(51) Int. Cl.
*G06F 12/00* (2006.01)
*G06F 12/12* (2006.01)

(52) U.S. Cl.
CPC .................. *G06F 12/126* (2013.01)
USPC ............ 711/118; 711/128; 711/170; 711/202

(58) Field of Classification Search
USPC .................. 711/118–146, 156, 158
See application file for complete search history.

(56) References Cited

U.S. PATENT DOCUMENTS 6,748,494 B1 * 6/2004 Yashiro .................. 711/133

FOREIGN PATENT DOCUMENTS

JP 2009-070098 4/2009
JP 2009070098 A * 4/2009

* cited by examiner

*Primary Examiner* — Shawn X Gu
(74) *Attorney, Agent, or Firm* — Sony Corporation

(57) ABSTRACT

There is provided a memory control device including a device driver that executes writing or reading of data to/from a main storage unit and temporary writing or reading of data to/from a cache unit including a plurality of cache blocks, and a control unit that issues an instruction for writing or reading of data of a file system to/from the main storage unit or the cache unit to the device driver. The control unit may notify priority information about a priority for data storage into a logical block to which the cache block is associated to the device driver.

15 Claims, 15 Drawing Sheets

| LOGICAL BLOCK ADDRESS 0 | USE STATUS: 0 | PRIORITY: HIGH | CACHE BLOCK ADDRESS 0 | CACHE BLOCK ADDRESS 4 | NO ALLOCATION (−) |
|---|---|---|---|---|---|
| LOGICAL BLOCK ADDRESS 10 | USE STATUS: 1 | PRIORITY: INTERMEDIATE | CACHE BLOCK ADDRESS 1 | − | − |
| LOGICAL BLOCK ADDRESS 100 | USE STATUS: 2 | PRIORITY: INTERMEDIATE | CACHE BLOCK ADDRESS 2 | − | − |
| LOGICAL BLOCK ADDRESS 1000 | USE STATUS: 3 | PRIORITY: LOW | CACHE BLOCK ADDRESS 3 | − | − |
| − | − | − | − | − | − |

FIG. 4

| LOGICAL BLOCK ADDRESS 0 | USE STATUS: 0 | PRIORITY: HIGH | CACHE BLOCK ADDRESS 0 | CACHE BLOCK ADDRESS 4 | NO ALLOCATION (—) |
|---|---|---|---|---|---|
| LOGICAL BLOCK ADDRESS 10 | USE STATUS: 1 | PRIORITY: INTERMEDIATE | CACHE BLOCK ADDRESS 1 | — | — |
| LOGICAL BLOCK ADDRESS 100 | USE STATUS: 2 | PRIORITY: INTERMEDIATE | CACHE BLOCK ADDRESS 2 | — | — |
| LOGICAL BLOCK ADDRESS 1000 | USE STATUS: 3 | PRIORITY: LOW | CACHE BLOCK ADDRESS 3 | — | — |
| — | — | — | — | — | — |

MEMORY CONTROL DEVICE, MEMORY DEVICE, MEMORY CONTROL METHOD, AND PROGRAM

BACKGROUND

The present disclosure relates to a memory control device, a memory device, a memory control method, and a program.

A memory device includes a main storage unit and a cache block that are capable of storing data, for example, and a device driver controls storing of data into the main storage unit and the cache block.

In the memory device, data that is updated less frequently is stored in the main storage unit, and data that is updated more frequently is stored in the cache block from the viewpoint of speeding up processing by the device driver (cf. Japanese Unexamined Patent Application Publication No. 2009-70098). Note that, because the capacity of the cache block is smaller than that of the main storage unit, when cached data increases, old data, for example, is transferred from the cache block to the main storage unit. This processing is known as writeback.

SUMMARY

An operating system such as Linux abstracts control processing (driver) of a device and separates it from control processing of a file system. Because of the abstraction, file system control operates without knowing the intrinsic properties of the device.

Then, when the cache block is built in the memory device for speeding up of driver processing as described in Japanese Unexamined Patent Application Publication No. 2009-70098, only the device driver controls the timing of writeback. This leads to a problem that writeback occurs to a cache block with a high data update frequency, and data is thereby transferred from the cache block to a user block.

In light of the foregoing, it is desirable to provide a novel and improved memory control device, memory device, memory control method, and program capable of preventing writeback from occurring to a cache block that stores data with a high update frequency.

According to an embodiment of the present disclosure, there is provided a memory control device including a device driver that executes writing or reading of data to/from a main storage unit and temporary writing or reading of data to/from a cache unit including a plurality of cache blocks, and a control unit that issues an instruction for writing or reading of data of a file system to/from the main storage unit or the cache unit to the device driver. The control unit may notify priority information about a priority for data storage into a logical block to which the cache block is associated to the device driver.

The device driver may select a cache block whose data is to be transferred to the main storage unit among the plurality of cache blocks based on the priority information notified from the control unit.

The device driver may transfer data stored in a cache block associated with the logical block with the lowest priority among the plurality of cache blocks to the main storage unit.

The device driver may store the priority information, updates the priority information upon receiving notification of the priority information from the control unit, and transfers data stored in a cache block associated with the logical block with the lowest priority among the plurality of cache blocks to the main storage unit based on the updated priority information.

The device driver may store the updated priority information and information about a use status of the logical block in association with each other, and transfers data stored in a cache block associated with the logical block with the earliest date of use among a plurality of logical blocks with the same priority to the main storage unit.

The control unit may notify the priority information to the device driver at initial startup of the memory control device.

The control unit may notify the priority information to the device driver when allocating a cache block not storing data in the cache unit.

According to an embodiment of the present disclosure, there is provided a memory device including a main storage unit that stores data, a cache unit that includes a plurality of cache blocks and temporarily stores data, a device driver that executes writing or reading of data to/from the main storage unit and temporary writing or reading of data to/from the cache unit, and a control unit that issues an instruction for writing or reading of data of a file system to/from the main storage unit or the cache unit to the device driver. The control unit may notify priority information about a priority for data storage into a logical block to which the cache block is associated to the device driver.

According to an embodiment of the present disclosure, there is provided a memory control method including executing writing or reading of data to/from a main storage unit and temporary writing or reading of data to/from a cache unit including a plurality of cache blocks by a device driver, issuing an instruction for writing or reading of data of a file system to/from the main storage unit or the cache unit to the device driver by a control unit, and notifying priority information about a priority for data storage into a logical block to which the cache block is associated to the device driver by the control unit.

According to an embodiment of the present disclosure, there is provided a program causing a computer to execute executing writing or reading of data to/from a main storage unit and temporary writing or reading of data to/from a cache unit including a plurality of cache blocks by a device driver, issuing an instruction for writing or reading of data of a file system to/from the main storage unit or the cache unit to the device driver by a control unit, and notifying priority information about a priority for data storage into a logical block to which the cache block is associated to the device driver by the control unit.

As described above, according to the present disclosure can prevent writeback from occurring to a cache block that stores data with a high update frequency.

BRIEF DESCRIPTION OF THE DRAWINGS

FIG. 4 is a diagram showing cache block management information;

DETAILED DESCRIPTION OF THE EMBODIMENT(S)

Figure 1:
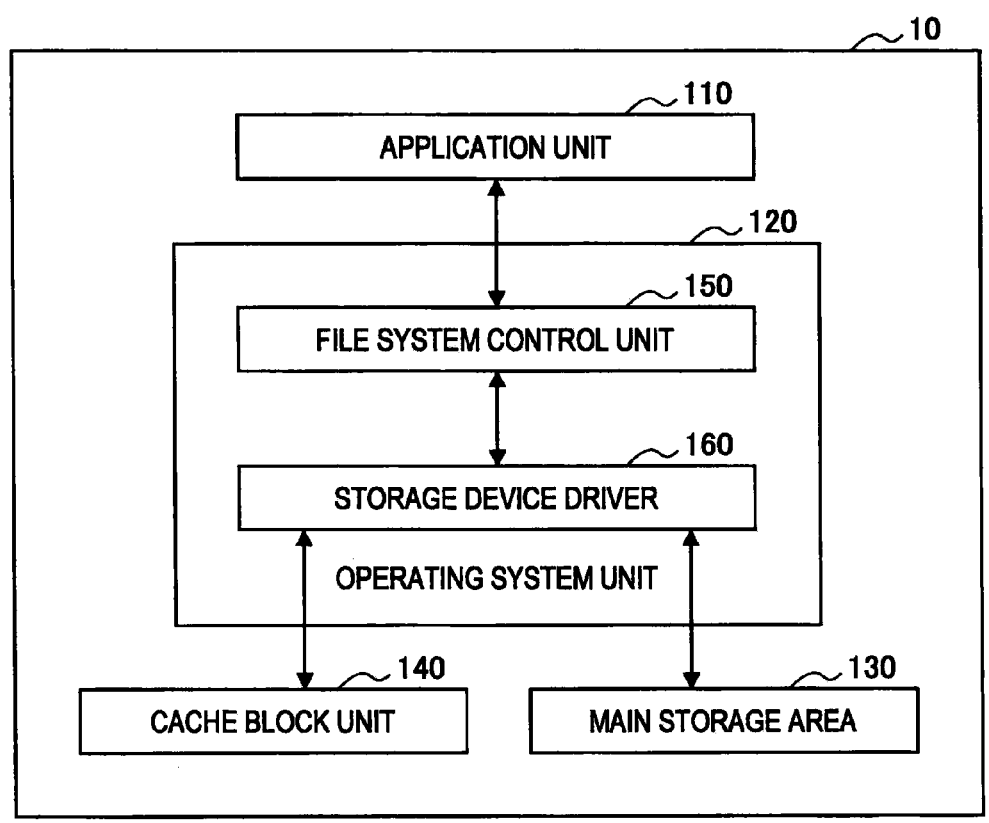
FIG. 1 is a block diagram showing a configuration of a memory management device 10.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description is provided in the following order:
1. Outline of Memory Device
2. Process at Initial Startup
3. Process at File Creation
3-1. Outline of File Creation
3-2. Notification of Cache Priorities in Write
3-2-1. Rewrite
3-3. Notification of Timing Information in Close
3-3-1. Flush
4. Notification of Timing Information in Mkdir
5 Summary <1. Outline of Memory Device>

An outline of a memory management device 10, which is an example of a memory device according to an embodiment, is described with reference to FIG. 1. FIG. 1 is a block diagram showing a configuration of the memory management device 10.

Referring to FIG. 1, the memory management device 10 includes an application unit 110, an operating system unit 120, a main storage area 130, which is an example of a main storage unit, and a cache block unit 140, which is an example of a cache unit.

(Application Unit 10)

The application unit 110 implements various functions in the memory management device 10. The application unit 110 transmits a request about a file system to the operating system unit 120. For example, the application unit 110 transmits a request for file creation or deletion or a request for directory creation or deletion to the operating system unit 120.

(Operating System Unit 120)

The operating system unit 120 controls the operation of the memory management device 10. The operating system unit 120 controls reading or writing of data in the main storage area 130 and the cache block unit 140 in response to a request from the application unit 110. The operating system unit 120 transmits a processing result according to the request of the application unit 110 to the application unit 110.

(Main Storage Unit 130)

The main storage area 130 is a nonvolatile memory and stores various kinds of data. The main storage area 130 is formatted with FAT file system that handles data in units of files.

(Cache Block Unit 140)

The cache block unit 140 is a nonvolatile memory and temporarily stores data with a high usage frequency (access frequency). The cache block unit 140 includes a plurality of cache blocks, each cache block capable of storing data. The cache block unit 140 is also formatted with FAT file system. Note that the capacity of the cache block unit 140 is smaller than the capacity of the main storage area 130. When the amount of data in the cache block unit 140 exceeds a predetermined amount, writeback is performed to transfer data of the cache block unit 140 to the main storage area 130 as described in detail later.

(File System)

The file system is described hereinafter, using FAT (File Allocation Table) file system as an example.

The file system is a mechanism to manage files on storage media (the main storage area 130 and the cache block unit 140 in this embodiment). Specifically, the file system is a system that associates files or directories logically handled by a user with actual physical storage media and thereby creates files or directories. The FAT file system is managed by using information called directory entry and FAT.

In the FAT file system, a file is stored in units of clusters, and the physical locations of a plurality of clusters belonging to one file are not always contiguous. The FAT manages the sequence in which a plurality of clusters are arranged to form one file.

The directory is a name of a group having a hierarchical structure to manage files. Information of files contained in each directory is called directory entry. In the directory entry, information such as file or another directory name, extension, attribute, data size, and file start cluster number (start cluster number) are contained. A directory at the highest level of the hierarchy is called a root directory, and a directory at a lower level is called a subdirectory.

A storage medium formatted in the FAT file system has a plurality of FAT regions, root directory region, actual data region and the like. The FAT region is a region to store FAT item, which is information indicating the location of files of data stored in the data region. The FAT region typically contains two copies, and the same contents are stored in each region.

The root directory region is a region to manage the location of files. The root directory region is where root directory entries containing files located in the root directory and information about subdirectories are stored. The data region is where the content (actual data) of files and information about files residing in subdirectories and subdirectories.

To access data in the storage medium, a part of the file stored in the data region is read out by reference to the start cluster number contained in the root directory entry. Then, the location in the data region where the next data is stored is specified by reference to the FAT, and data in the specified location is read out.

(File System Control Unit 150)

Referring back to FIG. 1, the configuration of the memory management device 10 is further described. The operating system unit 120 includes a file system control unit 150, which is an example of the control unit, and a storage device driver (which is also referred to simply as a device driver) 160, which is an example of the device driver.

The file system control unit 150 transmits an instruction in response to a request from the application unit 110 to the device driver 160. For example, the file system control unit 150 issues an instruction for writing or reading of data to/from the main storage area 130 or the cache block unit 140 to the device driver 160.

The file system control unit 150 notifies priority information indicating the priorities (which are also referred to hereinafter as "cache priorities") for data storage into logical blocks to which each cache block of the cache block unit 140 is associated to the device driver 160. Specifically, the file system control unit 150 notifies priority information of logical blocks to which each cache block is associated to the device driver 160 at the initial startup of the memory management device 10 or at the time of allocating a cache block not storing data in the cache block unit 140.

Figure 2:
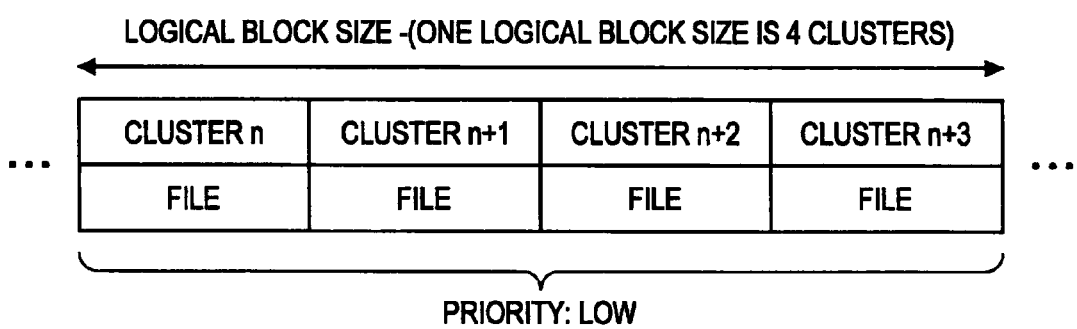
FIG. 2 is a diagram showing an example of assignment of cache priorities.
Figure 3:
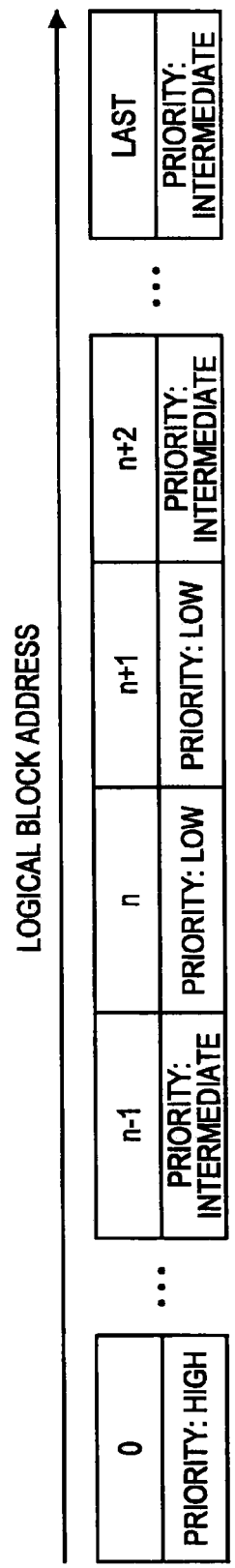
FIG. 3 is a diagram showing notification of cache priorities.

Processing of the file system control unit 150 that is performed for notification of cache priorities is described hereinafter with reference to FIGS. 2 and 3. FIG. 2 is a diagram showing an example of assignment of cache priorities. FIG. 3 is a diagram showing the details of notification of cache priorities.

First, the file system control unit 150 acquires the size of a logical block from the device driver 160. For example, when one logical block includes four clusters as shown in FIG. 2, the size of the logical block is four clusters.

Next, the file system control unit 150 checks the usage of a region where data is placed. For example, in the case of FAT format, the file system control unit 150 checks all clusters in use to see whether they are used as file or directory. In FIG. 2, all clusters are used as file.

Then, the file system control unit 150 decides a cache priority of each logical block based on the checking result. The file system control unit 150 according to the embodiment assigns cache priorities to logical blocks in the manner described hereinbelow. The file system control unit 150 assigns a high cache priority to a logical block where FAT is placed because it is updated all the time, and assigns an intermediate cache priority to a logical block where directories are placed. The file system control unit 150 assigns a low priority to a logical block where only files are placed because it is updated less frequently than the logical block where directories are placed and have less necessity to be cached. For example, because only files are placed in the logical block of FIG. 2, the file system control unit 150 assigns a low cache priority to the logical block.

The file system control unit 150 performs the above-described processing on all logical blocks to thereby assign cache priorities to all logical bocks. After that, the file system control unit 150 notifies the cache priorities assigned to all logical blocks to the device driver 160 as shown in FIG. 3.

Note that, although the priorities assigned to logical blocks are high, intermediate and low in the above example, it is not limited to the three. For example, the assigned priorities may be two (high and low), or four or more.

As described above, the file system control unit 150 notifies the priority information to the device driver 160, and the device driver 160 can thereby preferentially transfer data stored in the cache block with a low cache priority at the time of writeback. As a result, it is possible to prevent data with a high update frequency from being transferred to the main storage area 130 at the time of writeback. It is also possible to prevent the access time to the data from increasing due to the transfer of the data to the main storage area 130.

Further, the file system control unit 150 notifies timing information indicating timing when writeback (data transfer) can be performed to the device driver 160. Specifically, the file system control unit 150 recognizes the details of processing requested from the application unit 110 and, when it determines that other processing is not requested following the requested processing based on the determination result of the processing, the file system control unit 150 notifies the timing information to the device driver 160. For example, when the file system control unit 150 receives a request for file close or the like from the application unit 110, the file system control unit 150 notifies the timing information to the device driver 160.

As described above, the file system control unit 150 notifies the timing information to the device driver 160, and thus the device driver 160 can prevent writeback from occurring during execution of other processing (for example, write). As a result, it is possible to prevent the processing speed of other processing such as write from decreasing due to writeback.

(Device Driver 160)

Referring back to FIG. 1, the configuration of the memory management device 10 is further described. The device driver 160 controls the main storage area 130 and the cache block unit 140 in response to an instruction from the file system control unit 150. The device driver 160 executes writing or reading of data to/from the main storage area 130 and temporary writing or reading of data to/from the cache block unit 140.

The device driver 160 selects a cache block whose data is to be transferred to the main storage area 130 at the time of writeback based on the priority information notified from the file system control unit 150. Specifically, the device driver 160 selects a cache block with the lowest cache priority among a plurality of cache blocks constituting the cache block unit 140. Then, the device driver 160 transfers data stored in the selected cache block with the lowest cache priority to the main storage area 130 at the time of writeback. It is thus possible to prevent data stored in the cache block with a high cache priority (data with a high update frequency) from being transferred to the main storage area 130 at the time of writeback.

Note that, when there is a free cache block, the device driver 160 writes data into the free cache block regardless of the cache priority of the logical block. On the other hand, when there is no free cache block, the device driver 160 performs writeback and makes a free cache block.

The device driver 160 stores the priority information notified from the file system control unit 150 as a part of cache block management information.

The cache block management information stored in the device driver 160 is described hereinafter with reference to FIG. 4. FIG. 4 is a diagram showing cache block management information. The management information indicates correspondence between cached logical blocks and cache blocks.

The management information contains information of address, use status and cache priority of logical blocks. The use status is comparison among logical blocks (e.g. four logical blocks in FIG. 4), and a smaller value indicates that the logical block is used (data is written) more recently. In FIG. 4, the logical block with the address 0 is used most recently among the four logical blocks. As the cache priority, one of high, intermediate and low is assigned to each logical block. A logical block with a higher cache priority is cached more preferentially. In FIG. 4, the priority of the logical block with the address 0 is high. Note that there is an upper limit to the number of logical blocks to be cached, and it is five in the example of FIG. 4.

Further, a plurality of cache blocks can be allocated to one logical block. In FIG. 4, the cache block with the address 0 and the cache block with the address 4 are allocated to the logical block with the address 0. Note that there is an upper limit to the number of cache blocks allocable to one logical block, and it is three in the example of FIG. 4.

The device driver 160 stores address translation information for each offset address in a logical block. In other words, the device driver 160 stores at which offset address of which cache block data corresponding to the offset address is stored.

Figure 5:
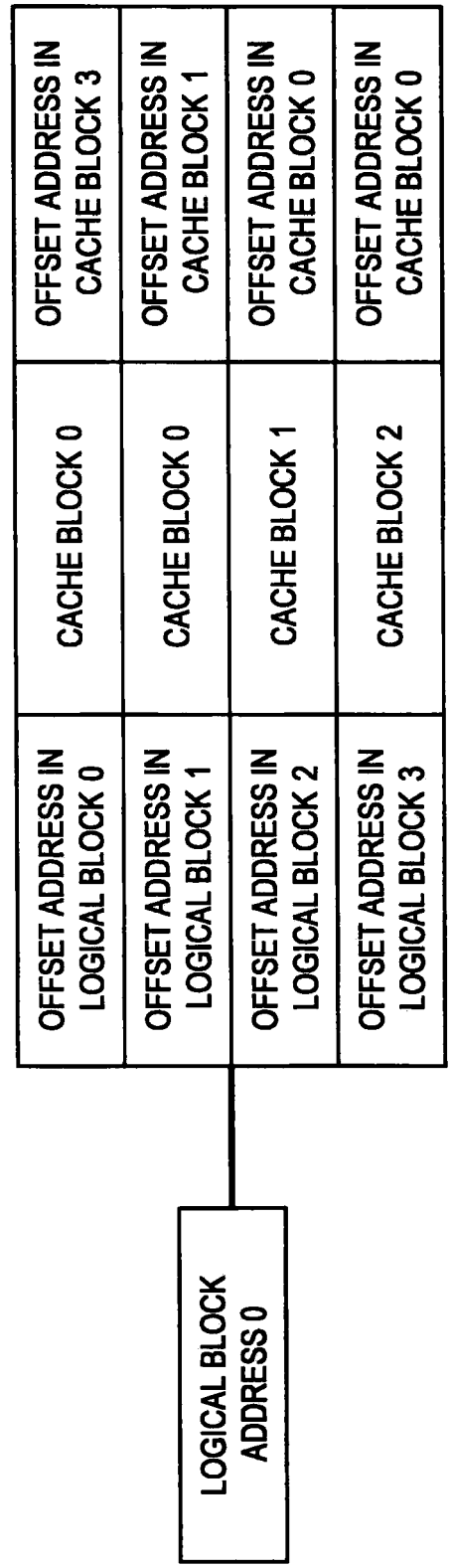
FIG. 5 is a diagram showing address translation information for each offset address.

FIG. 5 is a diagram showing address translation information for each offset address. In FIG. 5, address translation information for each offset address in the logical block with the address 0 is shown. For example, data corresponding to the offset address 0 in the logical block is stored at the offset address 3 in the cache block 0.

The device driver 160 updates the above-described management information upon receiving notification of the priority information from the file system control unit 150. Then, at the time of writeback, the device driver 160 transfers data stored in the cache block with the lowest cache priority to the main storage area 130 based on the updated priority information. Consequently, data stored in the cache block with the lowest cache priority is transferred to the main storage area 130 by writeback after receiving the priority information.

In the case where there are a plurality of logical blocks with the same cache priority, the device driver 160 transfers data stored in a cache block associated with the logical block with the earliest date of use to the main storage area 130. The cache block with the earlier date of use is less likely to update the data stored therein than the cache block with the later date of use. It is thus possible to prevent data with a high update frequency from being transferred to the main storage area 130 at the time of writeback even when there are a plurality of logical blocks with the same priority.

Further, the device driver 160 receives the timing information for writeback from the file system control unit 150 as described earlier. Receiving the timing information, the device driver 160 determines whether or not to execute writeback. Specifically, upon receiving the timing information, the storage device driver 160 determines whether or not to execute writeback based on the use status of cache blocks in the management information.

The device driver 160 executes writeback in the following case. First, the device driver 160 forcibly executes writeback when the number of logical blocks that use cache blocks at the time of receiving notification of the timing information reaches a predetermined number. It is thus possible to store data only in the cache block corresponding to the logical block with a high cache priority.

Further, the device driver 160 forcibly executes writeback when the number of cache blocks allocated to a logical block at the time of receiving notification of the timing information reaches a predetermined number. It is thus possible to avoid that an excessive number of cache blocks are allocated to one logical block.

Furthermore, the device driver 160 forcibly executes writeback when the number of cache blocks that do not store data in the cache block unit 140 at the time of receiving notification of the timing information is less than a predetermined number. It is thus possible to maintain a predetermined number of free cache blocks.

As described above, because the device driver 160 executes writeback in response to receiving the timing information, it is possible to prevent writeback from being executed during other processing, thus avoiding a decrease in the processing speed of other processing.

The memory management device 10 further includes a CPU, ROM, RAM and the like, which are not shown. The CPU loads a program read from the ROM, an external storage device or the like to the RAM and executes the program, thereby implementing various processes (such as a file creation process described later). Note that the program may be stored in a recording medium.

<2. Process at Initial Startup>

Figure 6:
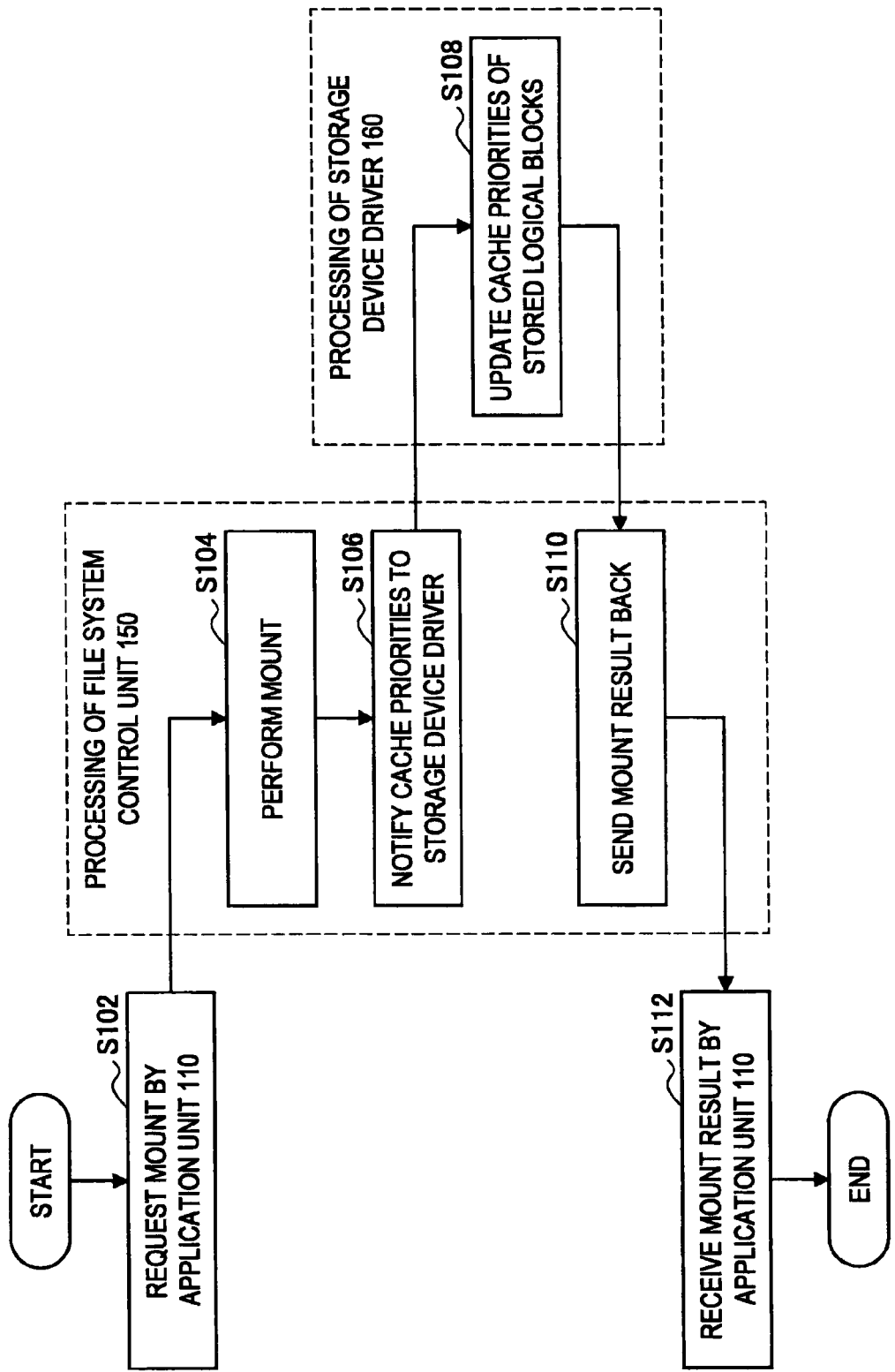
FIG. 6 is a flowchart to explain a process at initial startup of the memory management device 10.

As described above, the file system control unit 150 notifies the priority information to the device driver 160 at the initial startup of the memory management device 10. Hereinafter, a process of notifying the priority information at the initial startup of the memory management device 10 is described with reference to FIG. 6. FIG. 6 is a flowchart to explain a process at the initial startup of the memory management device 10. This process is implemented by the CPU executing a program stored in the ROM or the like.

The flowchart of FIG. 6 begins when the application unit 110 makes a request for mount to the file system control unit 150 (Step S102). Receiving the mount request from the application unit 110, the file system control unit 150 executes mount (Step S104).

Mount in Step S104 is described hereinafter.

Figure 7:
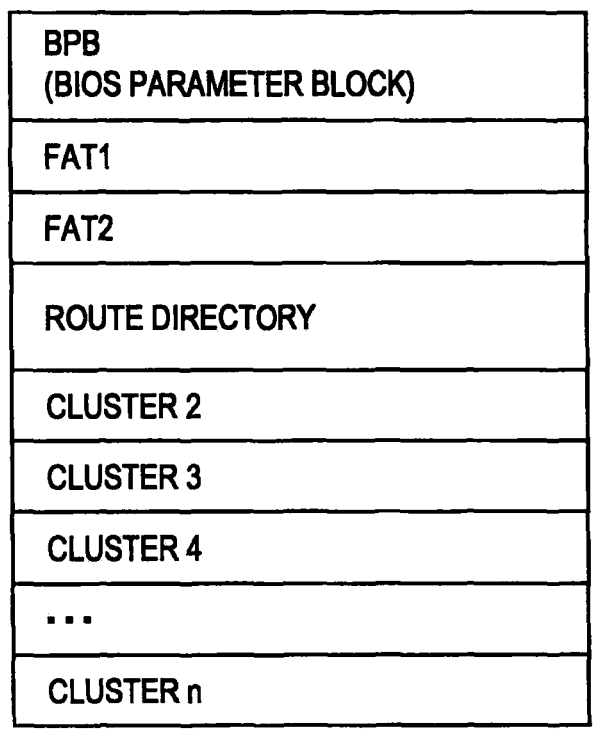
FIG. 7 is a diagram showing a partition structure of FAT file system.

The system control unit 150 provides an interface defined by ISO/IEC9945 (POSIX), for example, to the application unit 110. Further, the file system control unit 150 manages files or directories on the device driver 160 in a structure (format) specific to the file system. For example, the format defined by ISO/IEC9293 (JIS X 0605) (FAT format) is used as shown in FIG. 7. FIG. 7 is a diagram showing a partition structure of the FAT file system.

Mount is a preparatory process for enabling the interface provided to the application unit 110 by the file system control unit 150, and it is a process of reading format information from the device driver 160. The read information is information stored in BPB (BIOS Parameter Block) region, FAT1 region and FAT2 region in the FAT format of FIG. 7. Specifically, the read information is information about the storage address and size of information for managing a file system format and the storage address and size of data. Note that each cluster of the FAT format in FIG. 7 is used as a directory or file.

Referring back to the flowchart of FIG. 6, the process at the initial startup is further described. After execution of mount in Step S104, the file system control unit 150 notifies cache priorities to the device driver 160 (Step S106).

Next, the device driver 160 updates the cache priority of each of the stored logical blocks based on the notified cache priorities (Step S108). For example, the device driver 160 updates the cache priority by changing it from Intermediate to High.

Then, the file system control unit 150 transmits a mount result to the application unit 110 (Step S110). The application unit 110 receives the mount result (Step S112), and the process at the initial startup thereby ends.

As described above, in the process at the initial startup, cache priorities are notified from the file system control unit 150 to the device driver 160, and the device driver 160 updates the cache priority of each of the stored logical blocks. In this case, because the file system control unit 150 notifies the priority information to the device driver 160, the device driver 160 can preferentially transfer data stored in the cache block with a low cache priority at the time of writeback. As a result, it is possible to prevent data with a high update frequency from being transferred to the main storage area 130 at the time of writeback.

<3. Process at File Creation>

Notification of cache priorities is performed at the initial startup as described above. Notification of cache priorities is performed also at the time of file creation. Hereinafter, a process of notifying the priority information at the time of file creation is described.

(3-1. Outline of File Creation)

Figure 8:
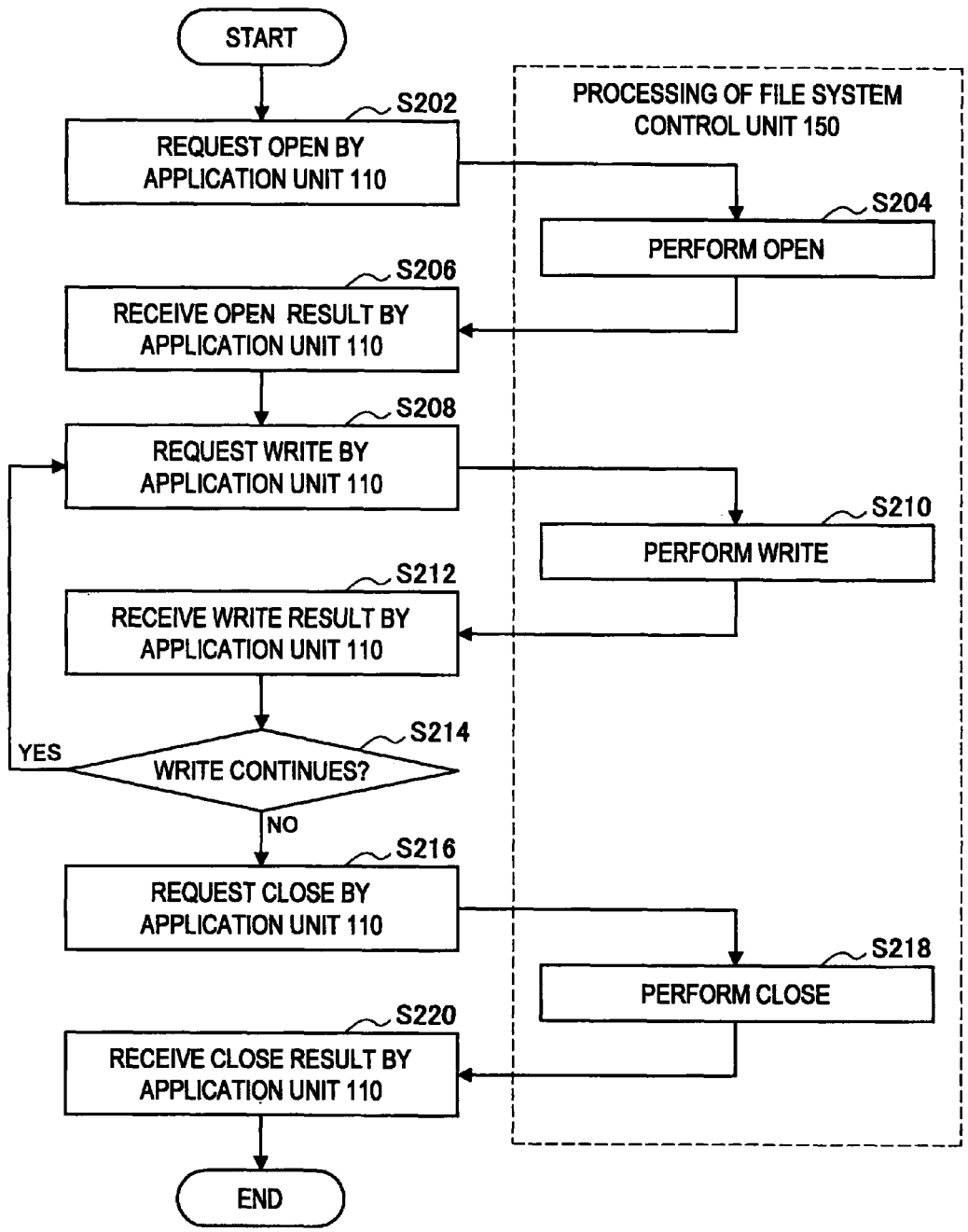
FIG. 8 is a flowchart to explain a general outline of a file creation process.

First, a general outline of a file creation process is described with reference to FIG. 8. FIG. 8 is a flowchart to explain a general outline of a file creation process. This process is implemented by the CPU executing a program stored in the ROM or the like.

The flowchart of FIG. 8 begins when the application unit 110 requests the file system control unit 150 to open a file (Step S202). Receiving the open request from the application unit 110, the file system control unit 150 executes open (Step S204). Note that, although notification of cache priorities is performed at the time of executing open, it is described in detail later.

The application unit 110 receives an open result from the file system control unit 150 (Step S206). Then, the application unit 110 requests the file system control unit 150 to write data to the file (Step S208).

Receiving the write request from the application unit 110, the file system control unit 150 executes write (Step S210). Note that, although notification of cache priorities is performed at the time of executing write, it is described in detail later.

The application unit 110 receives a write result from the file system control unit 150 (Step S212). Then, in the case of further performing writing to the file (YES in Step S214), the processing of Steps S208 to S212 described above is repeated.

On the other hand, in the case of finishing writing to the file (NO in Step S214), the application unit 110 requests the file system control unit 150 to close the file (Step S216).

Receiving the close request from the application unit 110, the file system control unit 150 executes close (Step S218). Note that, although notification of the timing information is performed at the time of executing close, it is described in detail later.

The application unit 110 receives a close result from the file system control unit 150 (Step S220). A series of processing at the time of file creation thereby ends.

(3-2. Notification of Cache Priorities in Write)

Notification of cache priorities in the open process in Step S204 of FIG. 8 and notification of cache priorities in the write process in Step S210 of FIG. 8 are the same. Thus, notification of cache priorities in the write process is described hereinbelow.

Figure 9:
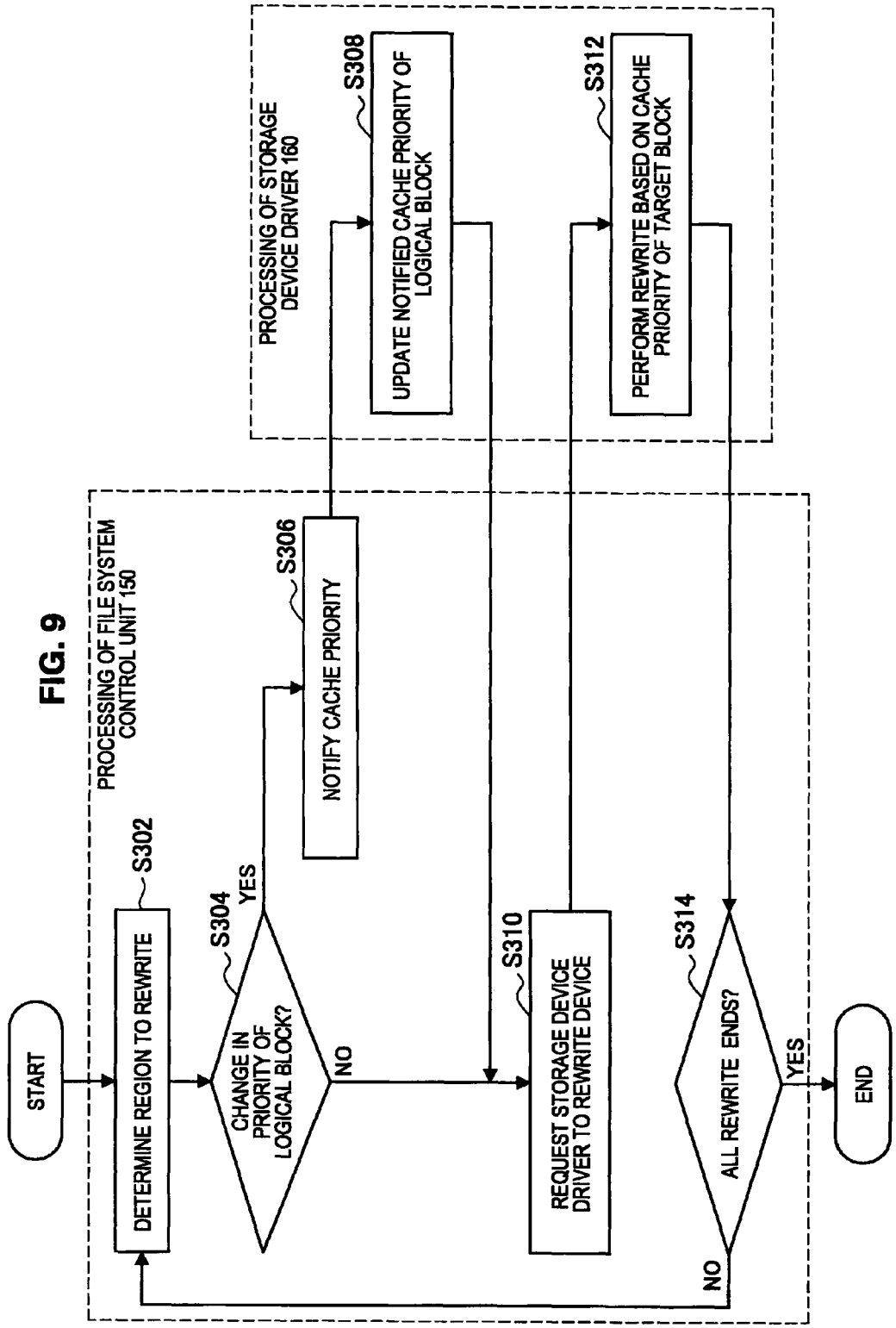
FIG. 9 is a flowchart to explain notification of cache priorities in a write process.

FIG. 9 is a flowchart to explain notification of cache priorities in the write process. First, the file system control unit 150 decides a region where data is rewritten (rewrite region) (Step S302).

Next, the file system control unit 150 determines whether there is a change in the cache priority of a logical block corresponding to the rewrite region (Step S304). When there is a change in the cache priority (YES in Step S304), the file system control unit 150 notifies a cache priority to the device driver 160 (Step S306).

Processing of the file system control unit 150 that is performed for notification of cache priorities is described hereinafter. As described above with reference to FIG. 2, the file system control unit 150 assigns a cache priority to a logical block based on the usage of the logical block. After that, the file system control unit 150 notifies the cache priority assigned to the logical block to the device driver 160.

Note that, although the cache priorities of all logical blocks are notified in the process at the initial startup as described earlier with reference to FIG. 3, only the cache priority newly assigned to the logical block may be notified in the write process. This reduces the amount of data of notification and thereby reduces the processing time involving notification of the cache priority.

Referring back to the flowchart of FIG. 9, the process is further described. The device driver 160 updates the cache priority of the stored logical block based on the cache priority notified from the file system control unit 150 (Step S308).

The file system control unit 150 requests the device driver 160 to rewrite the device (Step S310). Receiving a request for rewrite of the device, the device driver 160 performs rewrite based on the cache priority of a target block (Step S312). Rewrite is described in detail later.

The file system control unit 150 receives a rewrite result from the device driver 160 and checks the result. Then, the processing of Steps S302 to S312 described above is repeated until rewrite ends.

After rewrite completes, the process ends and returns to the flowchart of FIG. 8.

(3-2-1. Rewrite)

Figure 10:
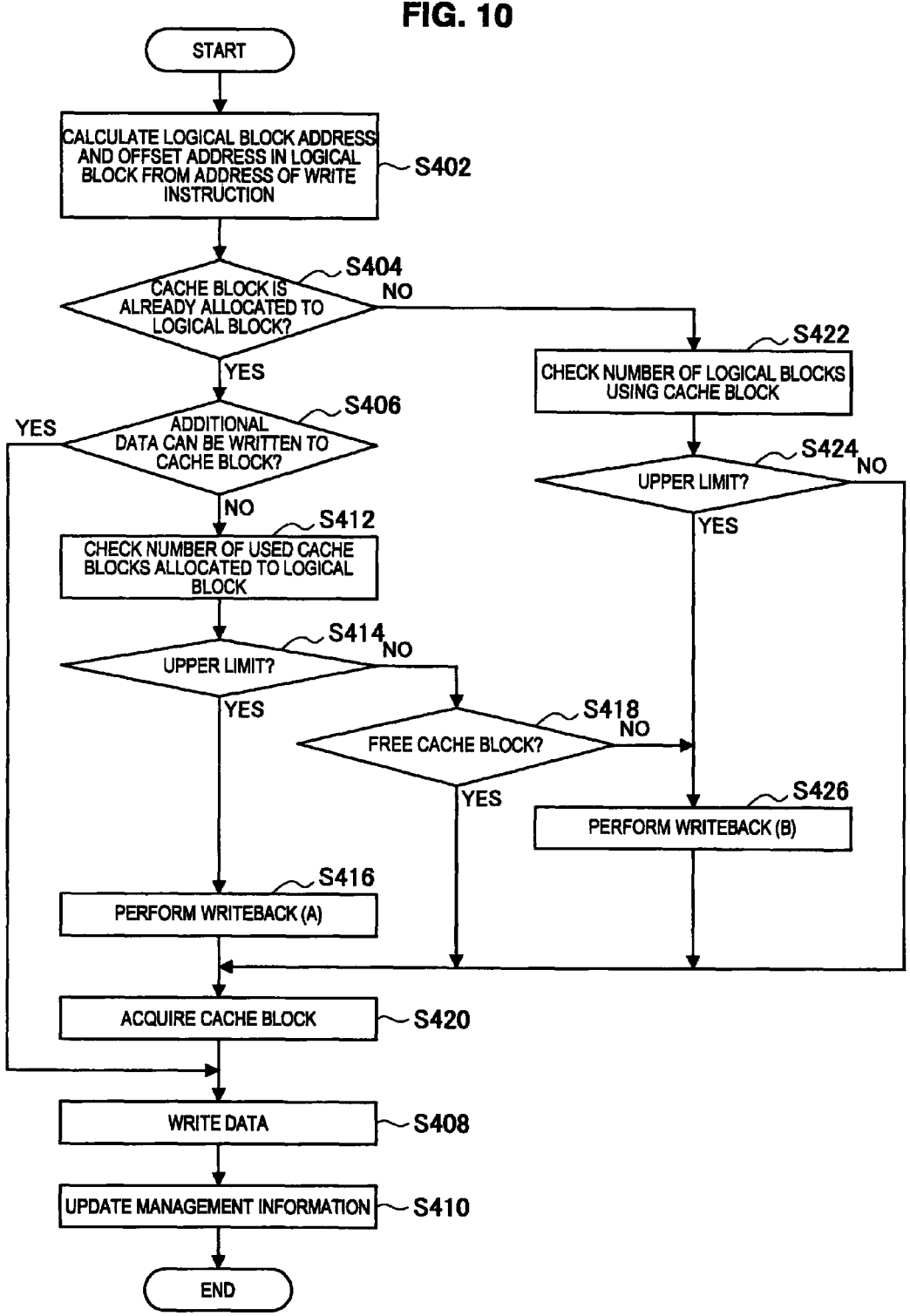
FIG. 10 is a flowchart to explain rewrite process.

Rewrite in Step S312 of FIG. 9 is described hereinafter with reference to FIG. 10. FIG. 10 is a flowchart to explain the rewrite process.

In the rewrite process, the device driver 160 first calculates a logical block address and offset addresses in the logical block from an address corresponding to the write instruction (Step S402). The device driver 160 calculates the logical block address and the offset addresses in the logical block based on the management information of FIG. 4 and the address translation information of FIG. 5.

Next, the device driver 160 determines whether a cache block is already allocated to the logical block based on the management information (Step S404). When a cache block is already allocated to the logical block in Step S404 (YES), the device driver 160 determines whether additional data can be written to the cache block (Step S406).

When additional writing of data to the cache block is possible in Step S406 (YES), the device driver 160 writes data to the cache block (Step S408). Then, the device driver 160 updates the management information (Step S410).

On the other hand, when additional writing of data to the cache block is not possible in Step S406 (NO), the device driver 160 checks the number of used cache blocks allocated to the logical block (S412). Then, the device driver 160 determines whether the number of used cache blocks allocated to the logical block reaches an upper limit (e.g. three shown in FIG. 4) (Step S414).

When the number of used cache blocks reaches the upper limit in Step S414 (YES), the device driver 160 executes writeback (A) to create a free cache block (Step S416).

(Writeback (A))

Figure 11:
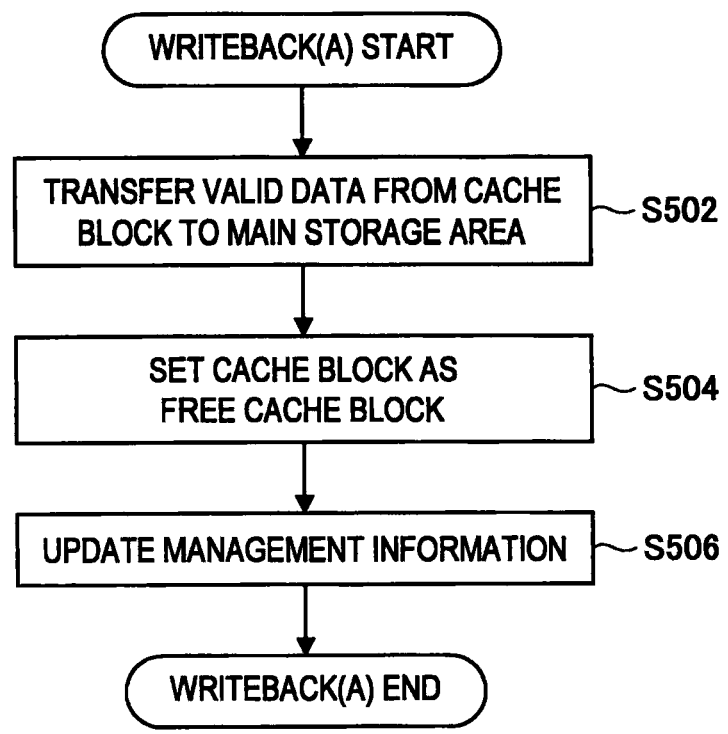
FIG. 11 is a flowchart to explain writeback (A) process.

Writeback (A) in Step S416 is described hereinafter with reference to FIG. 11. FIG. 11 is a flowchart to explain the writeback (A) process.

In the flowchart of FIG. 11, the device driver 160 first transfers valid data from a cache block to the main storage area 130 (Step S502). Next, the device driver 160 sets the cache block from which valid data has been removed as a free cache block (Step S504). The number of cache blocks from which valid data is transferred may be may be one or more than one.

Then, the device driver 160 updates the management information shown in FIG. 2 for the cache block from which valid data has been removed (Step S506). The writeback (A) process thereby ends and returns to the flowchart of FIG. 10.

The above-described writeback (A) imposes a limitation to the number of cache blocks allocated to one logical block, and therefore, even if the capacity of the cache block unit 140 is small, ° ache blocks can be allocated to a plurality of logical blocks with a high update frequency.

Referring back to the flowchart of FIG. 10, the rewrite process is further described. When writeback (A) in Step S416 completes, the device driver 160 acquires a free cache block (a cache block from which valid data has been removed) (Step S420). After that, the device driver 160 writes new data to the free cache block (Step S408) and updates the management information (Step S410).

When a cache block is not yet allocated to the logical block in Step S404 (NO), the device driver 160 checks the number of logical blocks using cache blocks (Step S422). Then, the device driver 160 determines whether the number of logical blocks using cache blocks reaches an upper limit (e.g. five shown in FIG. 4) (Step S424).

When the number of logical blocks using cache blocks reaches the upper limit in Step S424 (YES), the device driver 160 executes writeback (B) to create a free cache block (Step S426).

(Writeback (B))

Figure 12:
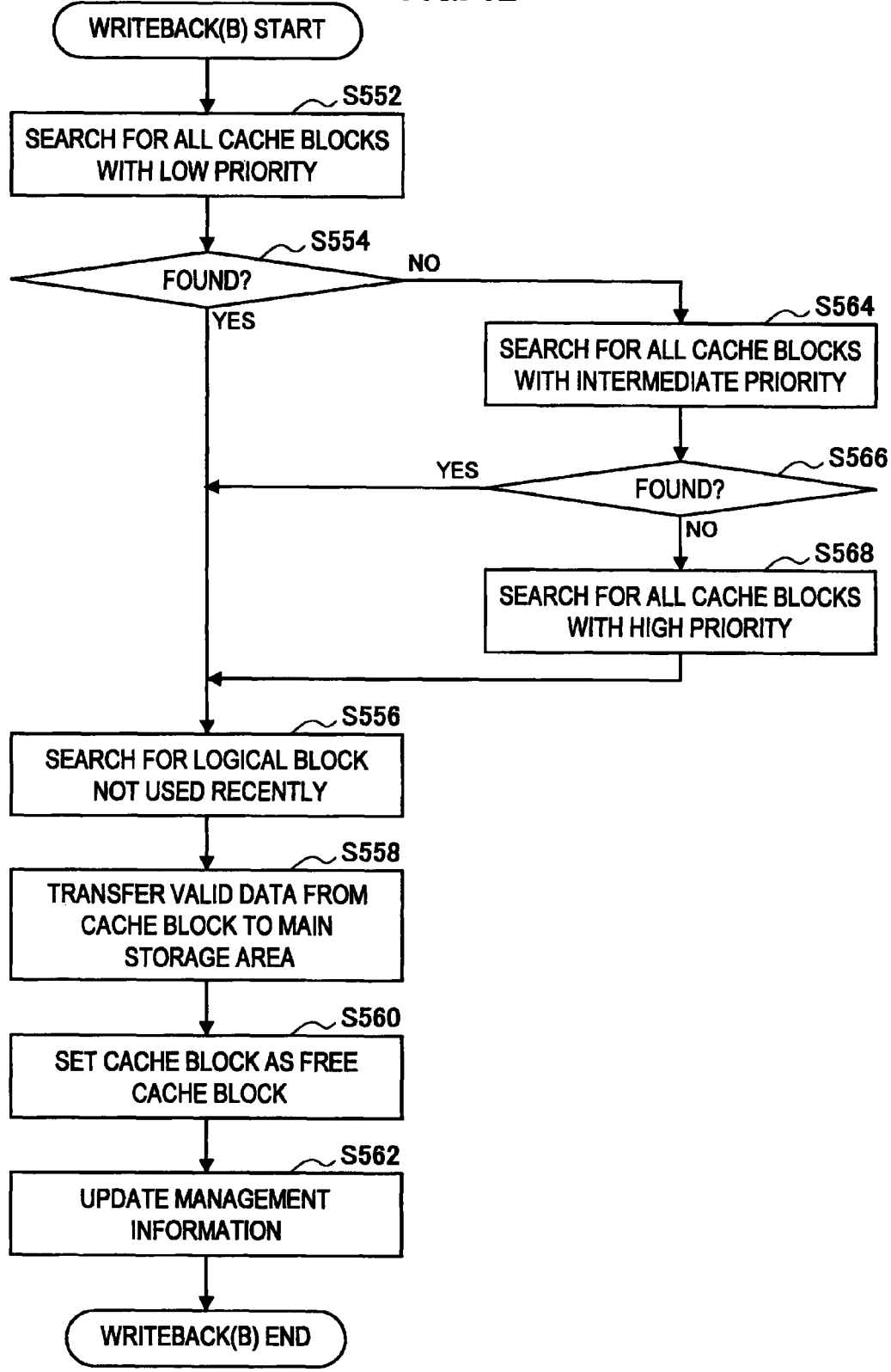
FIG. 12 is a flowchart to explain writeback (B) process.

Writeback (B) in Step S426 is described hereinafter with reference to FIG. 12. FIG. 12 is a flowchart to explain the writeback (B) process.

In the flowchart of FIG. 12, the device driver 160 first searches for all cache blocks allocated to logical blocks with a low cache priority from the management information (Step S552). Then, the device driver 160 determines whether there are cache blocks allocated to logical blocks with a low cache priority (Step S554).

When there are cache blocks allocated to logical blocks with a low cache priority in Step S554 (YES), the device driver 160 searches for a logical block that is not used recently among the logical blocks with a low cache priority (Step S556). In other words, the device driver 160 searches a logical block with a large value of the use status in the management information of FIG. 4.

Then, the device driver 160 transfers valid data in a cache block allocated to the logical block retrieved in Step S556 to the main storage area 130 (Step S558). The device driver 160 thereby sets the cache block allocated to the logical block that is not used recently among the logical blocks with the same low cache priority as a free cache block (Step S560). Note that, when a plurality of cache blocks are allocated to the logical block, the device driver 160 sets the allocated cache blocks as free cache blocks. After that, the device driver 160 updates the management information (Step S562).

When there are no cache blocks allocated to logical blocks with a low cache priority in Step S554 (NO), the device driver 160 searches for all cache blocks allocated to logical blocks with an intermediate cache priority (Step S564). Then, the device driver 160 determines whether there are cache blocks allocated to logical blocks with an intermediate cache priority (Step S566).

When there are cache blocks allocated to logical blocks with an intermediate cache priority in Step S566 (YES), the device driver 160 searches for a logical block that is not used recently among the logical blocks with an intermediate cache priority (Step S556). After that, the device driver 160 performs processing of Steps S558 to S562 described above.

When there are no cache blocks allocated to logical blocks with an intermediate cache priority in Step S566 (NO), the device driver 160 searches for all cache blocks allocated to logical blocks with a high cache priority (Step S568). Then, the device driver 160 searches for a logical block that is not used recently among the logical blocks with a high cache priority (Step S556). After that, the device driver 160 performs processing of Steps S558 to S562 described above.

After the update of the management information is done in Step S562, the writeback (B) process ends and returns to the flowchart of FIG. 10.

In writeback (B), the device driver 160 transfers data of a cache block allocated to a logical block with a low cache priority to the main storage area 130 based on the cache priorities notified from the file system control unit 150. It is thus possible to prevent data stored in a cache block allocated to the logical block with a high cache priority (data with a high update frequency) from being transferred to the main storage area 130 at the time of writeback.

Further, in writeback (B), when there a plurality of logical blocks with the same cache priority, the device driver 160 transfers data in a cache block allocated to the logical block with the earliest date of use to the main storage area 130. Because the logical block with the earliest date of use is less likely to be updated after that, it is possible to prevent data in a cache block allocated to another logical blocks (the logical block that is likely to be updated after that) from being transferred to the main storage area 130.

Referring back to the flowchart of FIG. 10, the rewrite process is further described. When writeback (B) in Step S426 completes, the device driver 160 acquires a free cache block (Step S420). After that, the device driver 160 writes data to the free cache block (Step S408) and updates the management information (Step S410).

Note that, when there is a free cache block in Step S418 (YES), the device driver 160 acquires a free cache block without performing writeback (Step S420). On the other hand, when there is no free cache block in Step S418 (NO), the device driver 160 performs the above-described writeback (B) (Step S426) and acquires a free cache block (Step S420).

Further, when the number of logical blocks using cache blocks does not reach the upper limit in Step S424 (NO), the device driver 160 acquires a free cache block without performing writeback (Step S420). After that, the device driver 160 writes data to the free cache block (Step S408) and updates the management information (Step S410).

As described above, in the write process, cache priorities are notified from the file system control unit 150 to the device driver 160, and the device driver 160 updates the cache priorities of the stored logical blocks (which is the same in the open process). In this case, because the file system control unit 150 notifies the priority information to the device driver 160, the device driver 160 can preferentially transfer data stored in a cache block with a low priority at the time of writeback. As a result, it is possible to prevent data with a high update frequency from being transferred to the main storage area 130 at the time of writeback.

(3-3. Notification of Timing Information in Close)

Figure 13:
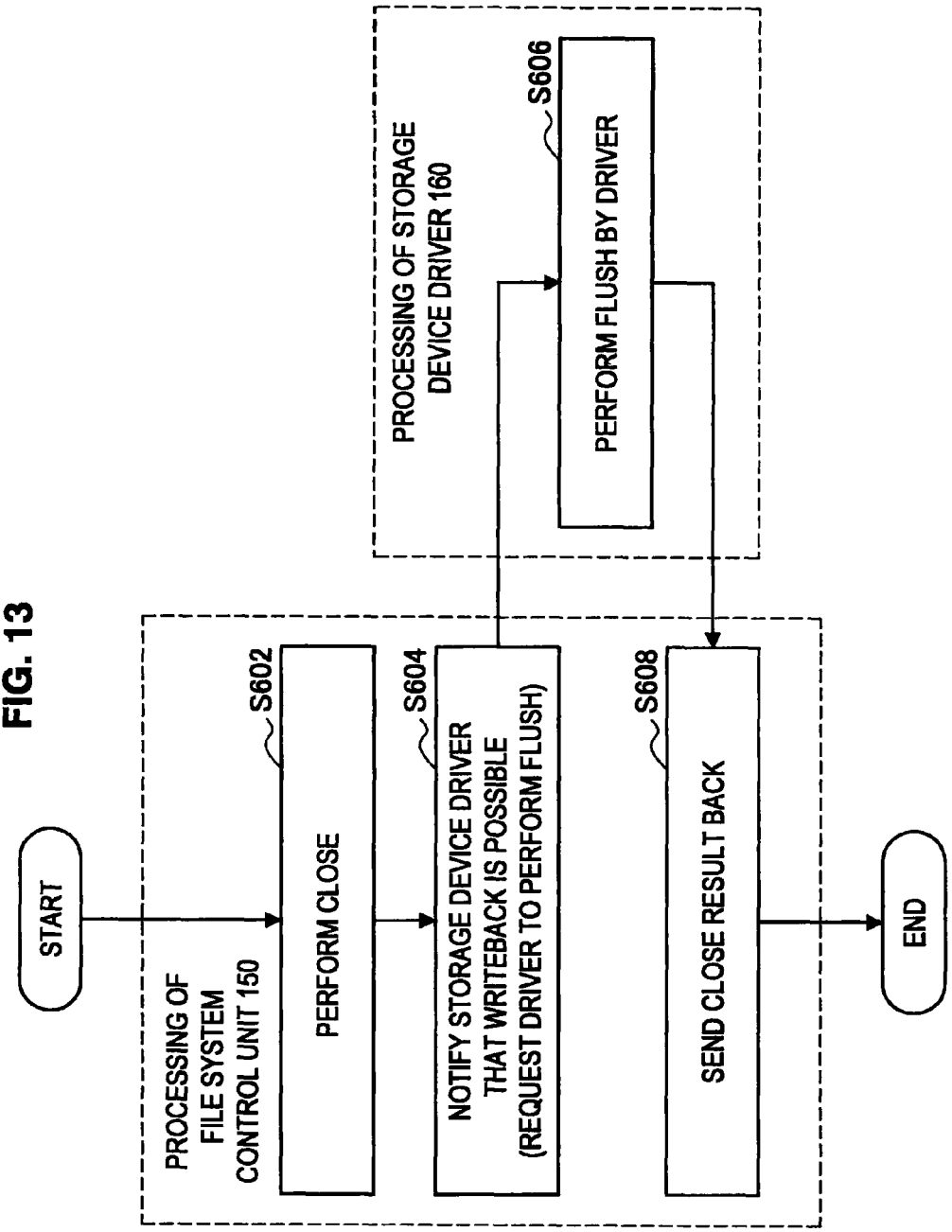
FIG. 13 is a flowchart to explain notification of timing information in close process.

Notification of the timing information in the close process of Step S218 in FIG. 8 is described hereinafter with reference to FIG. 13. FIG. 13 is a flowchart to explain notification of timing information in the close process.

First, the file system control unit 150 performs file close (Step S602). Close is the final process in file creation, and it is thus not likely that other processing is executed after this process, which is different from open and write. Therefore, by executing writeback during idle time after close, it is possible to prevent a decrease in the processing speed of other processing.

The file system control unit 150 notifies timing information indicating that writeback can be performed to the device driver 160 during idle time after close (Step S604). In response to the notification of the timing information, the file system control unit 150 requests the device driver 160 to perform flush. Flush is processing to forcibly execute writeback.

Figure 14:
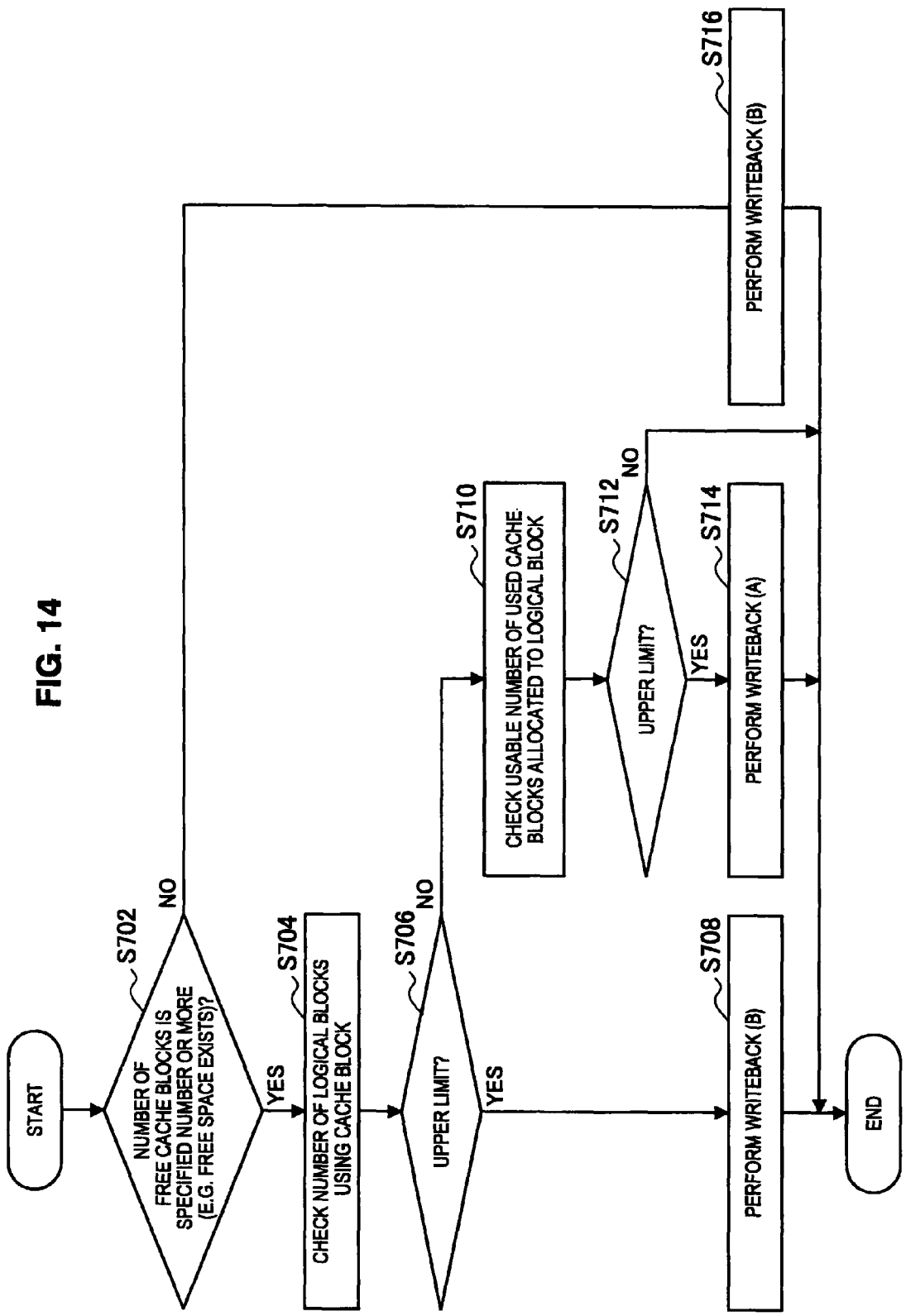
FIG. 14 is a flowchart to explain flush process.

Receiving the request for flush, the device driver 160 executes the flush process shown in FIG. 14 (Step S606). Note that the details of flush are described later.

Upon completion of flush, the file system control unit 150 transmits a close result to the application unit 110 (Step S608). The process thereby ends and returns to the flowchart of FIG. 8.

(3-3-1. Flush)

Flush in Step S606 of FIG. 13 is described hereinafter with reference to FIG. 14. FIG. 14 is a flowchart to explain the flush process.

The device driver 160 first determines whether the number of free cache blocks is a specified number or more (whether there is a free cache block, for example) (Step S702).

When it is determined that there is a free cache block in Step S702 (YES), the device driver 160 checks the number of logical blocks using cache blocks (Step S704). The device driver 160 then determines whether the number of logical blocks using cache blocks reaches an upper limit (e.g. five in FIG. 4) (Step S706).

When the number of logical blocks reaches the upper limit in Step S706 (YES), the device driver 160 executes writeback (B) in FIG. 12 described earlier (Step S708). On the other hand, when the number of logical blocks does not reach the upper limit in Step S706 (NO), the device driver 160 checks the number of used cache blocks allocated to the logical block (Step S710).

Then, the device driver 160 determines whether the number of used cache blocks allocated to the logical block reaches an upper limit (e.g. three in FIG. 4) (Step S712).

When the number of used cache blocks reaches the upper limit in Step S712 (YES), the device driver 160 executes writeback (A) in FIG. 11 described earlier (Step S714). On the other hand, when the number of used cache blocks does not reach the upper limit in Step S712 (NO), the device driver 160 finishes the process without executing writeback (A) and writeback (B).

When it is determined that there is no free cache block in Step S702 (NO), the device driver 160 executes writeback (B) in FIG. 12 described earlier (Step S716). The process thereby ends and returns to the flowchart of FIG. 13.

As described above, in the close process, the file system control unit 150 notifies the timing information to the device driver 160, and thus the device driver 160 can prevent writeback from occurring during execution of other processing (write, for example). As a result, it is possible to prevent the processing speed of other processing such as write from decreasing due to writeback.

<4. Notification of Timing Information in Mkdir>

Although notification of timing information for writeback is performed at the time of close in the above-described example, it may be performed at the time of mkdir, which is processing to create directories.

Figure 15:
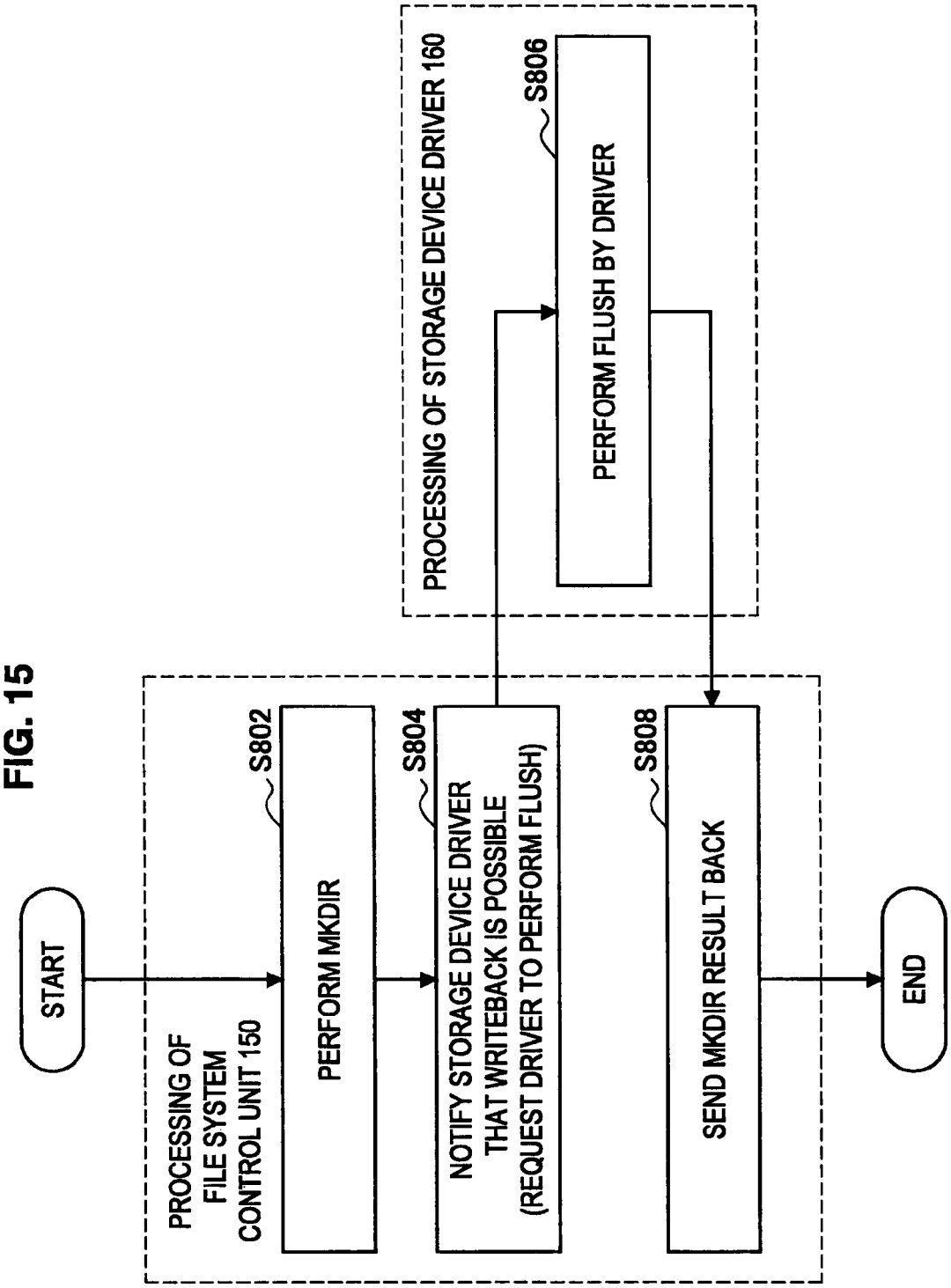
FIG. 15 is a flowchart to explain notification of timing information in mkdir process.

Notification of timing information for writeback in mkdir is described hereinafter with reference to FIG. 15. FIG. 15 is a flowchart to explain notification of timing information in the mkdir process.

First, the file system control unit 150 performs file mkdir (Step S802). The mkdir, like close, is not likely to be followed by other processing. Therefore, by executing writeback during idle time after mkdir, it is possible to prevent a decrease in the processing speed of other processing.

The file system control unit 150 notifies timing information indicating that writeback can be performed to the device driver 160 during idle time after mkdir (Step S804). In response to the notification of the timing information, the file system control unit 150 requests the device driver 160 to perform flush.

Receiving the request for flush, the device driver 160 executes flush in FIG. 14 described earlier (Step S806). Upon completion of flush, the file system control unit 150 transmits a mkdir result to the application unit 110 (Step S808).

As described above, in the mkdir process, the file system control unit 150 notifies the timing information to the device driver 160, and thus the device driver 160 can prevent writeback from occurring during execution of other processing (write, for example). As a result, it is possible to prevent the processing speed of other processing such as write from decreasing due to writeback.

Note that notification of timing information for writeback may be performed at the time of processing other than close or mkdir. For example, because rmdir, unlink and rename are also processing that is not likely to be followed by other processing, notification of timing information may be performed. Rmdir is processing to remove a directory. Unlink is processing to remove a file. Rename is processing to change a file name or move a file name.

Further, the application unit 110 may notify timing information to the device driver 160 when it is known that a request is not sent to the operating system unit 120 for a while based on determination of the application unit 110.

<5. Summary>

In the above-described embodiment, the file system control unit 150 notifies priority information indicating the priority for data storage into a logical block to which a cache block is associated to the device driver 160. The device driver 160 can thereby preferentially transfer data stored in a cache block with a low cache priority at the time of writeback. As a result, it is possible to prevent data with a high update frequency from being transferred to the main storage area 130 at the time of writeback.

Although preferred embodiments of the present disclosure are described above with reference to the appended drawings, the present disclosure is not limited thereto. It should be understood by those skilled in the art that various modifications, combinations, sub-combinations and alterations may occur depending on design requirements and other factors insofar as they are within the scope of the appended claims or the equivalents thereof.

Although the memory management device 10 includes the main storage area 130 and the cache block unit 140 in the above-described embodiments, it is not limited thereto, and the main storage area 130 and the cache block unit 140 may be incorporated into a device different from the memory management device 10. In such a case, the memory management device 10 functions as a memory control device.

Further, although the main storage area 130 and the cache block unit 140 are non-volatile memories in the above-described embodiments, it is not limited thereto. For example, either one of the main storage area 130 or the cache block unit 140 may be a non-volatile memory.

It should be noted that, in this specification, the steps shown in the flowcharts include not only a process performed in chronological order according to the sequence shown therein but also a process executed in parallel or individually, not necessarily performed in chronological order. Further, the steps processed in chronological order may be performed in a different sequence in some cases as a matter of course.

The present disclosure contains subject matter related to that disclosed in Japanese Priority Patent Application JP 2011-059385 filed in the Japan Patent Office on Mar. 17, 2011, the entire content of which is hereby incorporated by reference.

What is claimed is:

1. A memory control device comprising:
one or more processors operable to:
write or read data to or from a main storage unit and write or read the data to or from a cache unit that comprises a plurality of cache blocks;
receive an instruction for writing or reading of data of a file system to or from the main storage unit or the cache unit; and
receive priority information indicating a priority of a first logical block to which a first cache block of the plurality of cache blocks is associated,
wherein the priority of the first logical block is assigned based on whether clusters in the first logical block are used as a file or as a directory.

2. The memory control device according to claim 1, wherein the one or more processors are operable to select a second cache block among the plurality of cache blocks, whose data is to be transferred to the main storage unit, based on the received priority information.

3. The memory control device according to claim 2, wherein the one or more processors are operable to transfer the data stored in the second cache block associated with a second logical block with a priority lower than the first logical block, to the main storage unit.

4. The memory control device according to claim 3, wherein the one or more processors are operable to store the priority information, update the priority information on receiving another priority information, and transfer the data stored in the second cache block associated with the second logical block, to the main storage unit based on the updated priority information.

5. The memory control device according to claim 4, wherein the one or more processors are operable to store the updated priority information and information about a use status of each logical block in association with each other, and transfer data stored in a third cache block associated with a third logical block with a date of use earlier than other of a plurality of logical blocks having same priority to the main storage unit.

6. The memory control device according to claim 1, wherein the one or more processors are operable to receive the priority information at initial startup of the memory control device.

7. The memory control device according to claim 1, wherein the one or more processors are operable to receive the priority information when a fourth cache block, not storing data in the cache unit, is allocated.

8. The memory control device according to claim 1, wherein the one or more processors are operable to receive timing information indicating timing when write back of data from the first cache block to the main storage unit can be performed.

9. The memory control device according to claim 1, wherein the one or more processors are operable to write the data of the file system into a fifth cache block among the plurality of cache blocks, when the fifth cache block is free irrespective of a priority of a logical block associated with the fifth cache block.

10. The memory control device according to claim 1, wherein the one or more processors are operable to store address translation information containing information corresponding to an offset address for the first logical block.

11. The memory control device according to claim 1, wherein the one or more processors are operable to receive the priority information of the first logical block during writing of data when the priority is newly assigned to the first logical block.

12. The memory control device according to claim 1, wherein the priority information of the first logical block is set as low, when a use status of the first logical block is large compared to other logical blocks with same priority.

13. A memory device comprising:
a main storage unit that stores data;
a cache unit that comprises a plurality of cache blocks and temporarily stores the data; and
a control unit operable to:
issue an instruction for writing or reading of data of a file system to or from the main storage unit or the cache unit; and
transmit priority information indicating a priority of a logical block to which a cache block of the plurality of cache blocks is associated,
wherein the priority of the logical block is assigned based on whether clusters in the logical block are used as a file or as a directory.

14. A memory control method comprising:
writing or reading data to or from a main storage unit and writing or reading the data to or from a cache unit that comprises a plurality of cache blocks;
issuing an instruction for writing or reading of data of a file system tog-Pam to or from the main storage unit or the cache unit; and
transmitting priority information indicating a priority of a logical block to which a cache block of the plurality of cache blocks is associated,
wherein the priority of the logical block is assigned based on whether clusters in the logical block are used as a file or as a directory.

15. A non-transitory computer-readable storage medium having stored thereon, a computer program having at least one code section, the at least one code section being executable by a computer for causing the computer to perform steps comprising:
writing or reading data to or from a main storage unit and writing or reading the data to or from a cache unit that comprises a plurality of cache blocks;
receiving an instruction for writing or reading of data of a file system to or from the main storage unit or the cache unit; and
receiving priority information indicating a priority of a logical block to which a cache block of the plurality of cache blocks is associated,
wherein the priority of the logical block is assigned based on whether clusters in the logical block are used as a file or as a directory.

* * * * *